(12) United States Patent
Itou et al.

(10) Patent No.: US 6,835,152 B2
(45) Date of Patent: Dec. 28, 2004

(54) AUTOMATIC TRANSMISSION WITH A HYDRAULIC CONTROL APPARATUS

(75) Inventors: Masahiro Itou, Anjo (JP); Naoyuki Fukaya, Anjo (JP); Mikio Iwase, Anjo (JP); Yoshihiro Iijima, Toyota (JP); Hiromichi Kimura, Toyota (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 15 days.

(21) Appl. No.: 10/200,290

(22) Filed: Jul. 23, 2002

(65) Prior Publication Data

US 2003/0022749 A1 Jan. 30, 2003

(30) Foreign Application Priority Data

Jul. 25, 2001  (JP) ........................................ 2001-224785

(51) Int. Cl.$^7$ ................................................ F16H 61/12
(52) U.S. Cl. ........................................ 475/119; 477/906
(58) Field of Search .......................... 475/59, 65, 60, 475/116, 119; 477/906; 701/62

(56) References Cited

U.S. PATENT DOCUMENTS

| | | | | |
|---|---|---|---|---|
| 4,995,285 A | * | 2/1991 | Hayakawa et al. | 477/125 |
| 5,251,733 A | * | 10/1993 | Falck et al. | 477/79 |
| 5,778,330 A | * | 7/1998 | McKee | 701/62 |
| 6,227,062 B1 | * | 5/2001 | Doman | 74/335 |
| 6,394,926 B1 | * | 5/2002 | Jang | 475/116 |
| 6,494,803 B2 | * | 12/2002 | Suzuki et al. | 475/119 |
| 6,569,050 B2 | * | 5/2003 | Suzuki et al. | 475/122 |
| 2002/0035001 A1 | * | 3/2002 | Takahashi | 475/131 |

* cited by examiner

*Primary Examiner*—Sherry Estremsky
(74) *Attorney, Agent, or Firm*—Oliff & Berridge, PLC (57) ABSTRACT

An automatic transmission and method including a plurality of hydraulic servos which respectively engage and disengage a plurality of frictional engagement elements, a first solenoid valve for gear shifting which is used for generating a hydraulic pressure supplied to a predetermined hydraulic servo, a second solenoid valve for lock-up which is used for generating a hydraulic pressure supplied to a fluid transmission apparatus for executing a lock-up, a hydraulic control apparatus, a first connector which connects the first solenoid valve and the hydraulic control apparatus, a second connector which connects the second solenoid valve and the hydraulic control apparatus, a failsafe mechanism which achieves a predetermined shift range in a high-speed-side when the first connector is disconnected and a gear shift processing mechanism which achieves a predetermined shift range among a plurality of shift ranges when the second connector is disconnected.

10 Claims, 5 Drawing Sheets

| SHIFT POSITION | | | SOLENOID VALVE | | | | | | CLUTCH | | | | BRAKE | | | OWC | |
|---|---|---|---|---|---|---|---|---|---|---|---|---|---|---|---|---|---|
| | | | S4 | SR | DSL | SL1 | SL2 | SL3 | C0 | C1 | C2 | C3 | B1 | B2 | B3 | F1 | F2 |
| P | | | X | X | X | O | O | X | X | X | X | X | X | X | O | X | X |
| R | | | X | X | X | O | O | X | X | X | O | X | X | O | O | X | X |
| R(INHIBIT) | | | O | O | X | O | O | X | X | X | X | X | X | X | X | X | X |
| N | | | X | X | X | O | O | X | X | X | X | X | X | X | O | X | X |
| D | 1ST | | X | X | X | O | O | X | X | O | X | X | X | X | O | O | O |
| | 2ND | | X | X | X | X | O | X | X | O | X | X | O | X | O | X | O |
| | 3RD | | X | O | ⊚ | O | ⊚ | X | O | O | X | X | X | X | O | X | O |
| | 4TH | | X | O | ⊚ | X | ⊚ | O | O | X | X | X | O | X | O | X | O |
| | 5TH | | O | O | ⊚ | X | ⊚ | O | O | X | X | O | O | X | X | X | X |
| 3 | 1ST | | X | X | X | O | O | X | X | O | X | X | X | X | O | O | O |
| | 2ND | | X | X | X | X | O | X | X | O | X | X | O | X | O | X | O |
| | 3RD | | X | O | ⊚ | O | ⊚ | X | O | O | X | X | X | X | O | X | O |
| 2 | 1ST | | X | X | O | O | O | X | X | O | X | X | X | O | O | O | O |
| | 2ND | | X | X | X | X | O | X | X | O | X | X | O | X | O | X | O |
| D, 3 2 | SHIFT RANGE WHEN ALL SOLENOIDS ARE OFF | APPROXIMATE 4TH | X | X | X | X | X | X | O | O | X | O | X | X | X | X | X |
| | | 3RD | X | X | X | X | X | X | O | O | X | X | X | O | X | O | O |
| REMARKS | | O | | ON | | | | | ENGAGEMENT | | | | | LOCK | | | |
| | | X | | OFF | | | | | DISENGAGEMENT | | | | | FREE | | | |
| | | ⊚ | | ON:LOCK-UP ON OFF:LOCK-UP OFF | | | | | — | | | | | — | | | |

| SHIFT POSITION | | | SOLENOID VALVE | | | | | | CLUTCH | | | | BRAKE | | | OWC | |
|---|---|---|---|---|---|---|---|---|---|---|---|---|---|---|---|---|---|
| | | | S4 | SR | DSL | SL1 | SL2 | SL3 | C0 | C1 | C2 | C3 | B1 | B2 | B3 | F1 | F2 |
| P | | | × | × | × | ○ | ○ | × | × | × | × | × | × | × | ○ | × | × |
| R | | | × | × | × | ○ | ○ | × | × | × | ○ | × | × | ○ | ○ | × | × |
| R (INHIBIT) | | | ○ | ○ | × | ○ | ○ | × | × | × | × | × | × | × | × | × | × |
| N | | | × | × | × | ○ | ○ | × | × | × | × | × | × | × | ○ | × | × |
| D | | 1ST | × | × | × | ○ | ○ | × | × | ○ | × | × | × | × | ○ | ○ | ○ |
| | | 2ND | × | × | × | × | ○ | × | × | ○ | × | × | ○ | × | ○ | × | ○ |
| | | 3RD | × | ○ | ◎ | ○ | ◎ | × | ○ | ○ | × | × | × | × | ○ | × | ○ |
| | | 4TH | × | ○ | ◎ | × | ◎ | ○ | ○ | × | × | × | ○ | × | ○ | × | ○ |
| | | 5TH | ○ | ○ | ◎ | × | ◎ | ○ | ○ | × | × | ○ | ○ | × | × | × | × |
| 3 | | 1ST | × | × | × | ○ | ○ | × | × | ○ | × | × | × | × | ○ | ○ | ○ |
| | | 2ND | × | × | × | × | ○ | × | × | ○ | × | × | ○ | × | ○ | × | ○ |
| | | 3RD | × | ○ | ◎ | ○ | ◎ | × | ○ | ○ | × | × | × | × | ○ | × | ○ |
| 2 | | 1ST | × | × | ○ | ○ | ○ | × | × | ○ | × | × | × | ○ | ○ | ○ | ○ |
| | | 2ND | × | × | × | × | ○ | × | × | ○ | × | × | ○ | × | ○ | × | ○ |
| D, 3 | SHIFT RANGE WHEN ALL SOLENOIDS ARE OFF | APPROXIMATE 4TH | × | × | × | × | × | × | ○ | ○ | × | ○ | × | × | × | × | × |
| 2 | | 3RD | × | × | × | × | × | × | ○ | ○ | × | × | × | ○ | × | ○ |
| REMARKS | | ○ | ON | | | | | | ENGAGEMENT | | | | | | | LOCK | |
| | | × | OFF | | | | | | DISENGAGEMENT | | | | | | | FREE | |
| | | ◎ | ON: LOCK-UP ON  OFF: LOCK-UP OFF | | | | | | — | | | | | | | — | |

AUTOMATIC TRANSMISSION WITH A HYDRAULIC CONTROL APPARATUS

BACKGROUND OF THE INVENTION

1. Field of Invention

The invention relates to an automatic transmission with a hydraulic control apparatus.

2. Description of Related Art

Conventionally, an automatic transmission used in a vehicle such as an automobile and the like has a variable speed gear provided with a planetary gear unit and the like. The variable speed gear is provided with a plurality of frictional engagement elements such as a clutch, a brake and the like. The variable speed gear is structured so as to selectively output a rotation from gear elements such as a sun gear, a ring gear, a carrier and the like in the planetary gear unit so as to achieve a plurality of shift ranges by engaging and disengaging each of the frictional engagement elements in accordance with a predetermined combination.

The frictional engagement elements are engaged and disengaged by operating a hydraulic servo in a hydraulic circuit. Further, the hydraulic servo has a hydraulic servo drum having an outer peripheral wall and an inner peripheral wall, an annular piston slidably fitted within the hydraulic servo drum and the like. The hydraulic servo is structured so as to move the annular piston by supplying oil to and discharging oil from an apply oil chamber formed between the hydraulic servo drum and the annular piston, thereby engaging and disengaging the frictional engagement elements arranged in opposition to the annular piston.

Further, various kinds of solenoid valves, switch valves and the like are arranged in the hydraulic circuit. A predetermined switch valve is switched by turning on or off a solenoid of a predetermined solenoid valve, and a hydraulic pressure is supplied to the hydraulic servo connected to the switch valve. For that purpose, respective solenoids are mounted on valve bodies constituting the hydraulic circuit, and the respective solenoids and the control apparatus of the automatic transmission are connected by a wire connector unit.

SUMMARY OF THE INVENTION

However, in the related art, when an external force and the like are applied to the wire connector unit, there is a case that the wire connector unit comes off from the control apparatus and the like. However, in this case, the structure is made such that a failsafe operation is executed so as to drive the vehicle in a predetermined shift range, for example, a third speed.

However, in the conventional automatic transmission mentioned above, when the failsafe operation is executed and the speed is fixed in a third speed while the vehicle is running in a shift range in a high speed side such as a fourth speed, fifth speed and the like, a braking force of an engine brake becomes large, and a shift shock applied to a driver is increased.

Also, for example, in the case of driving the vehicle on a climbing road with a large inclination while the speed is fixed in the third speed, a load applied to the variable speed gear of the automatic transmission is increased, and a temperature of an oil, that is, an oil temperature becomes, for example, suddenly high.

The invention thus provides an automatic transmission according to an exemplary aspect of the invention with a plurality of hydraulic servos which respectively engage and disengage a plurality of frictional engagement elements, a first solenoid valve for gear shifting which is used for generating a hydraulic pressure supplied to a predetermined hydraulic servo, a second solenoid valve for lock-up which is used for generating a hydraulic pressure supplied to a fluid transmission apparatus for executing a lock-up, a hydraulic control apparatus, a first connector which connects the first solenoid valve and the hydraulic control apparatus, a second connector which connects the second solenoid valve and the hydraulic control apparatus, a failsafe mechanism which achieves a predetermined shift range in a high-speed-side when the first connector is disconnected and a gear shift processing mechanism which achieves a predetermined shift range among a plurality of shift ranges when the second connector is disconnected.

The automatic transmission according to a preferred form of the exemplary aspect of the invention is further provided with a shift range changing mechanism for achieving, after the predetermined shift range in high-speed-side is achieved when the first connector is disconnected, a predetermined shift range in a lower-speed-side than the predetermined shift range in the high-speed-side.

An automatic transmission according to another preferred form of the exemplary aspect of the invention is provided with a lock-up processing unit which executes a lock-up of the fluid transmission apparatus when the first connector is disconnected.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

An embodiment in accordance with the invention will be described in detail hereinafter with reference to the drawings.

Figure 2:
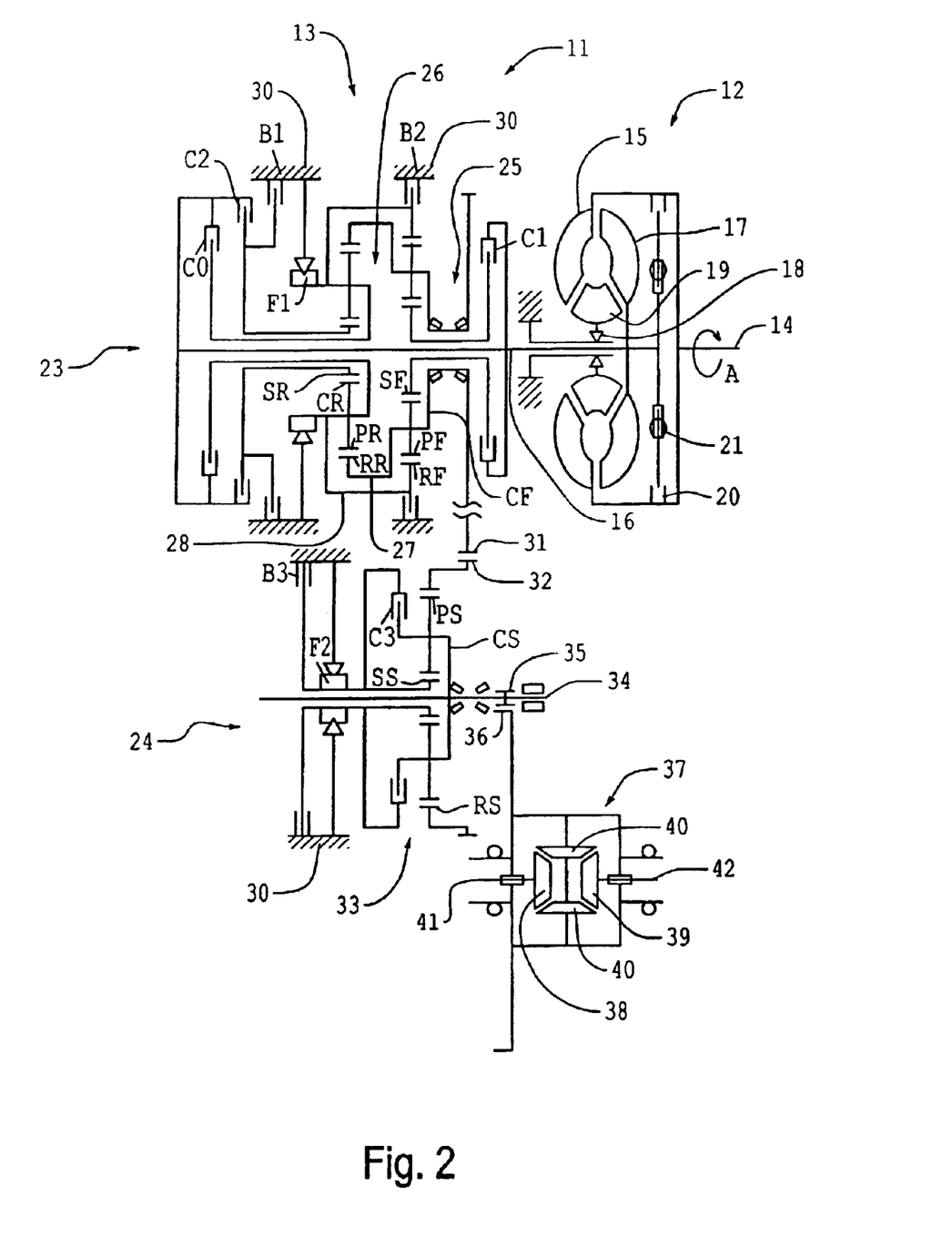
FIG. 2 is a conceptual diagram of an automatic transmission in the embodiment in accordance with the invention.
Figure 3:
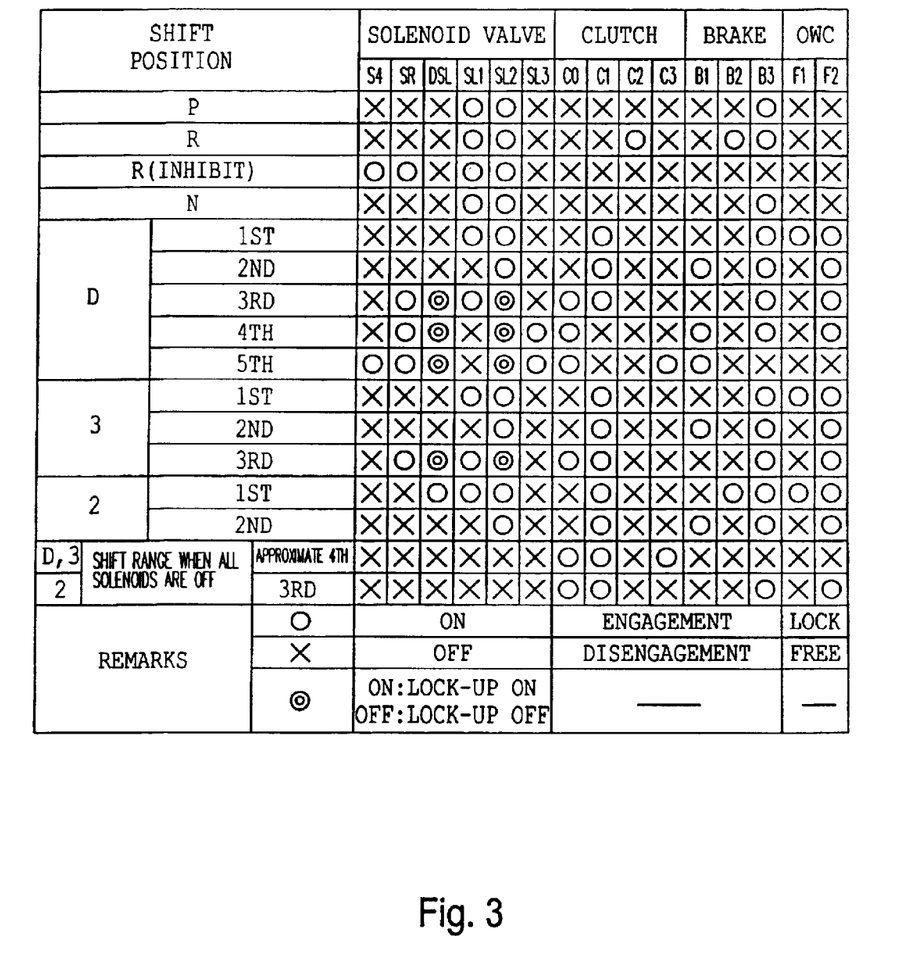
FIG. 3 is a view showing an operation table of the automatic transmission in the embodiment in accordance with the invention.

FIG. 2 is a conceptual diagram of an automatic transmission in the embodiment in accordance with the invention, and FIG. 3 is a view showing an operation table of the automatic transmission in the embodiment in accordance with the invention.

In FIG. 2, reference numeral 11 denotes an automatic transmission. The automatic transmission 11 is provided with a front planetary gear unit 25, a rear planetary gear unit 26 and a planetary gear unit 33 serving as a gear element, and has a first clutch C1, a second clutch C2, a third clutch C3, a fourth clutch C0, a first brake B1, a second brake B2 and a third brake B3 serving as frictional engagement elements. A state of transmitting a power is formed in a variable speed gear 13 by engaging and disengaging a predetermined frictional engagement element.

Further, reference numeral 12 denotes a torque converter serving as a fluid transmission apparatus which transmits a rotation in a direction of an arrow A generated by driving an engine (not shown) to the automatic transmission 11, and reference numeral 13 denotes the variable speed gear which changes a speed of the rotation transmitted from the torque converter 12 so as to output the rotation. The torque converter 12 is constituted by a pump impeller 15 connected to an output shaft 14 to which the rotation of the engine is output, a turbine runner 17 connected to an input shaft 16 which inputs the rotation to the variable speed gear 13, a stator 19 mounted onto a one way clutch 18, a lock-up clutch 20 which is engaged at a time when a predetermined condition is established and connects between the output shaft 14 and the input shaft 16 so as to execute a lock-up with a damper 21 and the like.

The variable speed gear 13 is constituted by a main transmission 23 and a sub transmission 24. Further, the main transmission 23 has the front planetary gear unit 25 and the rear planetary gear unit 26. The front planetary gear unit 25 is constituted by a sun gear SF, a ring gear RF concentrically arranged with the sun gear SF, a pinion PF engaged with the sun gear SF and the ring gear RF, and a carrier CF rotatably supporting the pinion PF. On the other hand, the rear planetary gear unit 26 is constituted by a sun gear SR, a ring gear RR concentrically arranged with the sun gear SR, a pinion PR engaged with the sun gear SR and the ring gear RR, and a carrier CR rotatably supporting the pinion PR.

The carrier CF and the ring gear RR are connected by a connecting element 27, and the carrier CR and the ring gear RF are connected by a connecting element 28. Further, the sun gear SF and the input shaft 16 are connected via the first clutch C1, and the ring gear RF and an automatic transmission case 30 are connected via the second brake B2 and a first one-way clutch F1 arranged in parallel to each other, respectively in a selective manner. Further, the carrier CF and a counter drive gear 31 are connected. Furthermore, the sun gear SR and the input shaft 16 are connected via the second clutch C2, the sun gear SR and the automatic transmission case 30 are connected via the first brake B1, the carrier CR and the input shaft 16 are connected via the fourth clutch C0, and the carrier CR and the automatic transmission case 30 are connected via the second brake B2 and the first one-way clutch F1 arranged in parallel to each other, respectively in a selective manner.

Meanwhile, the sub transmission 24 is provided with the planetary gear unit 33, and the planetary gear unit 33 is constituted by a sun gear SS, a ring gear RS concentrically arranged with the sun gear SS, a pinion PS engaged with the sun gear SS and the ring gear RS, and a carrier CS rotatably supporting the pinion PS. The sun gear SS and the automatic transmission case 30 are connected via the third brake B3 and a second one-way clutch F2 arranged in parallel to each other, and the sun gear SS and the carrier CS are connected via the third clutch C3, respectively in a selective manner. Further, the ring gear RS and a counter driven gear 32 are connected.

Furthermore, the structure is made such that the counter drive gear 31 and the counter driven gear 32 are engaged with each other so as to transmit a rotation of the main transmission 23 to the sub transmission 24. Further, the carrier CS and a counter shaft 34 are connected, and an output gear 35 fixed to the counter shaft 34 and a large ring gear 36 of a differential unit 37 are engaged. The differential unit 37 is provided with left and right side gears 38 and 39, and a pinion 40 engaged with each of the side gears 38 and 39, and distributes the rotation transmitted via the large ring gear 36 so as to transmit the rotation to drive shafts 41 and 42.

The first one-way clutch F1 becomes free in the case that an outer race (not shown) is fixed to the automatic transmission case 30 and an inner race (not shown) tries to rotate in the same direction (a forward direction) as a direction of an arrow A together with the carrier CR, and is locked in the case that the inner race tries to rotate in an opposite direction (a reverse direction) to the direction of the arrow A. Further, the second one-way clutch F2 is locked in the case that the outer race is fixed to the automatic transmission case 30 and the inner race tries to rotate in the forward direction together with the sun gear SS, and becomes free in the case that the inner race tries to rotate in the reverse direction.

Next, a description will be given of an operation of the automatic transmission 11 having the structure mentioned above.

In FIG. 3, reference symbols SL1 to SL3 denote the normal open type first to third solenoid valves for gear shifting, reference symbols S4 and SR denote the normal close type fourth and fifth solenoid valves, reference symbol DSL denotes a normal close type sixth solenoid valve for lock-up, reference symbol C1 denotes a first clutch, reference symbol C2 denotes a second clutch, reference symbol C3 denotes a third clutch, reference symbol C0 denotes a fourth clutch, reference symbol B1 denotes a first brake, reference symbol B2 denotes a second brake, reference symbol B3 denotes a third brake, reference symbols F1 and F2 denote first and second one-way clutches (OWC).

Then, regarding a shift position, reference symbol P denotes a parking range, reference symbol R denotes a reverse range, reference numeral N denotes a neutral range, reference numeral D denotes a forward range, reference numeral 3 denotes a third range, reference numeral 2 denotes a second range, reference symbol 1st denotes a first speed, reference symbol 2nd denotes a second speed, reference symbol 3rd denotes a third speed, reference symbol 4th denotes a fourth speed, and reference symbol 5th denotes a fifth speed.

Further, reference symbol "O" denotes an ON state in the first to sixth solenoid valves SL1 to SL3, S4, SR and DSL, an engaged state in the first clutch C1, the second clutch C2, the third clutch C3, the fourth clutch C0, the first brake B1, the second brake B2 and the third brake B3, and a locked state in the first and second one-way clutches F1 and F2. Reference symbol "x" denotes an OFF state in the first to sixth solenoid valves SL1 to SL3, S4, SR and DSL, a disengaged state in the first clutch C1, the second clutch C2, the third clutch C3, the fourth clutch C0, the first brake B1, the second brake B2 and the third brake B3, and a free state in the first and second one-way clutches F1 and F2. Further, reference symbol "⊙" denotes that an ON state is established when the lock-up clutch 20 (FIG. 2) is engaged (lock-up on), and an OFF state is established when the lock-up clutch 20 is disengaged (lock-up off).

In the first speed of the forward range, the first clutch C1 and the third brake B3 are engaged. In this case, in the main transmission 23, the rotation of the engine (the rotation in the forward direction) transmitted to the input shaft 16 is transmitted to the sun gear SF via the first clutch C1. Since the sun gear SF and the pinion PF are engaged, the sun gear SF tries to rotate the carrier CF in the forward direction.

However, since the carrier CF is connected to the drive shafts 41 and 42 via the counter drive gear 31 and the sub transmission 24, the carrier CF generates a reaction force. As a result, the ring gear RF tries to rotate in the reverse direction. However, since the ring gear RF is connected to the first one-way clutch F1 via the connecting element 28, the rotation in the reverse direction is prevented. As a result, the rotation in the forward direction with a reduced speed is output from the carrier CF, and is transmitted to the sub transmission 24 via the counter drive gear 31.

In the sub transmission 24, in accordance that the counter driven gear 32 is rotated in the reverse direction due to the rotation of the counter drive gear 31, the ring gear RS is also rotated in the reverse direction. Then, the sun gear SS tries to rotate in the forward direction in accordance with the rotation of the ring gear RS. However, the rotation in the forward direction is prevented since the sun gear SS is connected to the second one-way clutch F2. As a result, the sub transmission 24 is placed in an underdrive state, and the first-speed rotation in the forward direction is output from the carrier CS and is transmitted to the differential unit 37 via the output gear 35.

In the second speed of the forward range, the first clutch C1, the first brake B1 and the third brake B3 are engaged. In this case, in the main transmission 23, the sun gear SR is fixed in accordance with the engagement of the first brake B1. As a result, the rotation with a reduced speed is output from the carrier CF, and is transmitted to the sub transmission 24 via the counter drive gear 31.

Then, the sub transmission 24 is placed in the underdrive state, and the second-speed rotation in the forward direction is output from the carrier CS, and is transmitted to the differential unit 37 via the output gear 35.

In the third speed of the forward range, the first clutch C1, the fourth clutch C0 and the third brake B3 are engaged. In this case, in the main transmission 23, the front planetary gear unit 25 and the rear planetary gear unit 26 are in a directly connected state, in accordance with the engagement between the first clutch C1 and the fourth clutch C0, and the rotation in the forward direction with the speed of rotation equal to that of the engine is output from the carrier CF, and is transmitted to the sub transmission 24 via the counter drive gear 31.

Then, the sub transmission 24 is placed in the underdrive state, and the third-speed rotation in the forward direction is output from the carrier CS, and is transmitted to the differential unit 37 via the output gear 35.

In the fourth speed of the forward range, the fourth clutch C0, the first brake B1 and the third brake B3 are engaged. In this case, since the sun gear SR is fixed, and the rotation in the forward direction with the speed of rotation equal to that of the engine is transmitted to the carrier CR via the fourth clutch C0, an accelerated rotation is output from the ring gear RR and the carrier CF, and is transmitted to the sub transmission 24 via the counter drive gear 31.

Then, the sub transmission 24 is placed in the underdrive state, and the fourth-speed rotation in the forward direction is output from the carrier CS, and is transmitted to the differential unit 37 via the output gear 35.

In the fifth speed of the forward range, the third clutch C3, the fourth clutch C0 and the first brake B1 are engaged. In this case, in the main transmission 23, since the sun gear SR is fixed, and the rotation in the forward direction with the speed of rotation equal to that of the engine is transmitted to the carrier CR via the fourth clutch C0, the accelerated rotation is output from the ring gear RR and the carrier CF, and is transmitted to the sub transmission 24 via the counter drive gear 31.

Then, the sub transmission 24 is placed in an overdrive state, and the planetary gear unit 33 is placed in the directly connected state in accordance with the engagement of the third clutch C3. Then, a fifth-speed rotation in the forward direction is output from the carrier CS, and is transmitted to the differential unit 37 via the output gear 35.

Next, a description will be given of a hydraulic circuit.

Figure 4:
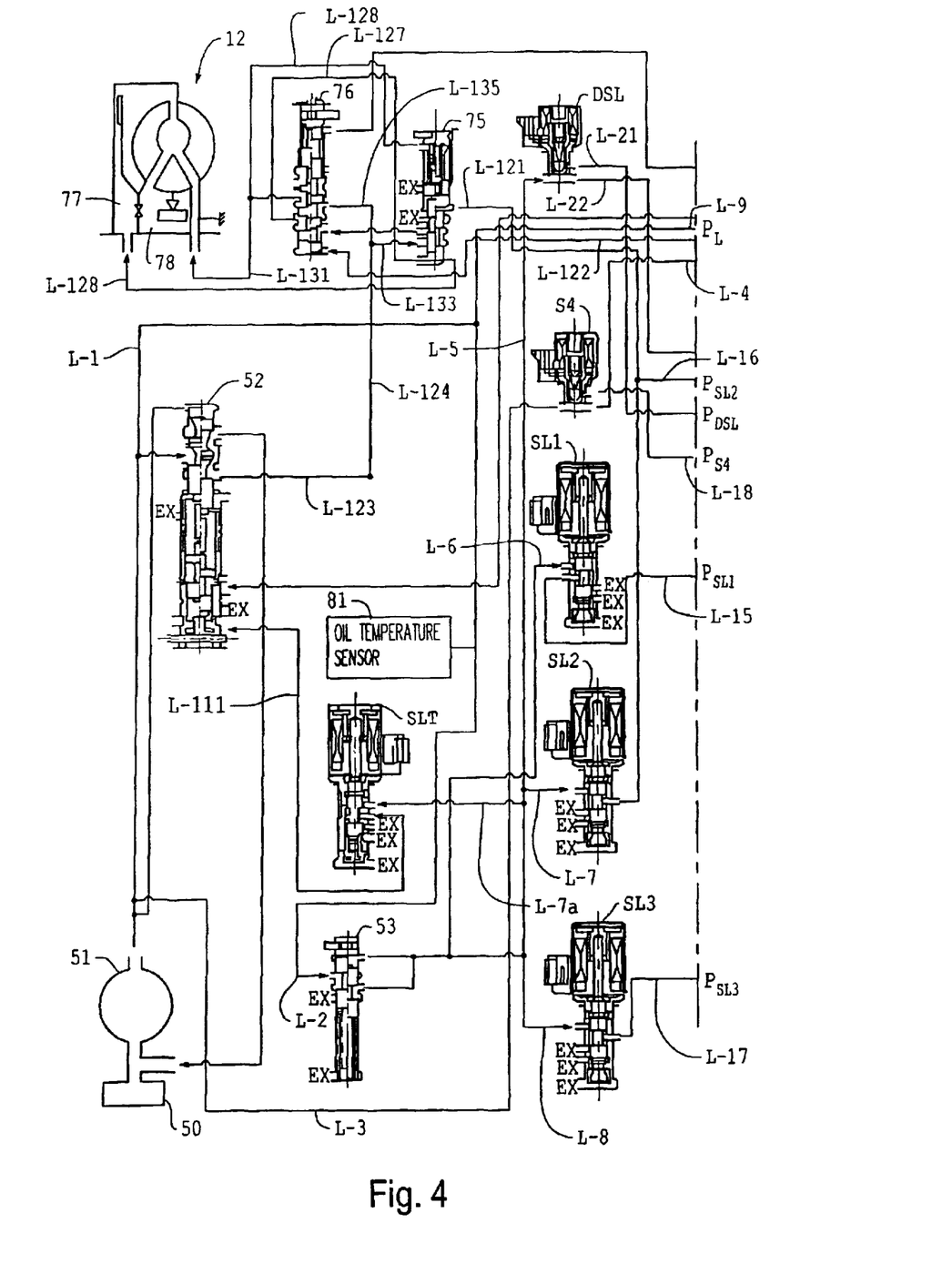
FIG. 4 is a first view showing a hydraulic circuit in the embodiment in accordance with the invention.
Figure 5:
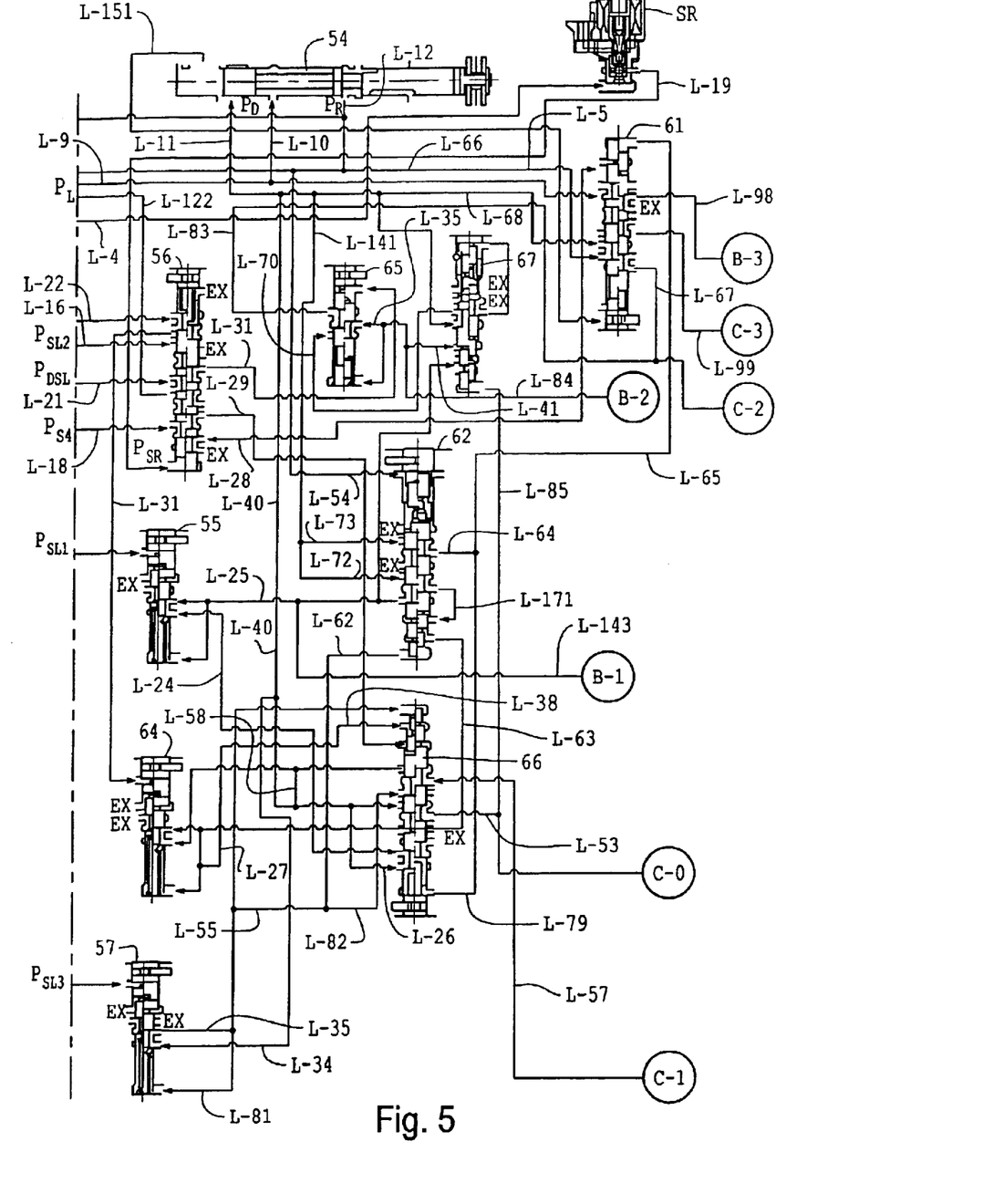
FIG. 5 is a second view showing the hydraulic circuit in the embodiment in accordance with the invention.

FIG. 4 is a first view showing the hydraulic circuit in the embodiment in accordance with the invention. FIG. 5 is a second view showing the hydraulic circuit in the embodiment in accordance with the invention. In this case, in each of valves of the hydraulic circuit, the first position is constituted by a left half position, and the second position is constituted by a right half position.

In the drawings, reference symbols C-1, C-2, C-3, C-0, B-1, B-2 and B-3 denote hydraulic servos which respectively engage and disengage the first clutch C1 (FIG. 2), the second clutch C2, the third clutch C3, the fourth clutch C0, the first brake B1, the second brake B2 and the third brake B3 in accordance with the supply and discharge of the hydraulic pressure. When a shift range to be achieved is selected by a gear shift processing mechanism of a control apparatus 100 (FIG. 1), a predetermined hydraulic servo is selected among the hydraulic servos C-1, C-2, C-3, C-0, B-1, B-2 and B-3 in correspondence to the shift range, and a predetermined hydraulic pressure for application is supplied to the selected hydraulic servo.

Further, reference numeral 50 denotes a strainer, reference numeral 51 denotes an oil pump which sucks and discharges an oil within an oil tank (not shown) via the strainer 50, and reference numeral 52 denotes a primary regulator valve. The primary regulator valve 52 adjusts the hydraulic pressure within an oil passage L-1 so as to generate a predetermined line pressure PL. The line pressure PL is supplied to a solenoid modulator valve 53 via an oil passage L-2, and is adjusted by the solenoid modulator valve 53 so as to generate the solenoid modulator pressure. In this case, an oil temperature sensor 81 is arranged in a predetermined portion of the oil passage L-2 as an oil temperature detecting apparatus for detecting an oil temperature.

Then, the line pressure PL generated by the primary regulator valve 52 is supplied to the fourth solenoid valve S4 corresponding to a switch member via the oil passages L-1 and L-3, and is supplied to the fifth solenoid valve SR via the oil passages L-1, L-3 and L-4. On the other hand, the solenoid modulator pressure generated by the solenoid modulator valve 53 is supplied to the sixth solenoid valve DSL via an oil passage L-5, is supplied to the first solenoid valve SL1 via an oil passage L-6, is supplied to the second solenoid valve SL2 via an oil passage L-7, is supplied to the third solenoid valve SL3 via an oil passage L-8, and is supplied to a seventh solenoid valve SLT via an oil passage L-7a.

In this case, since the first to third solenoid valves SL1 to SL3 and the seventh solenoid valve SLT are solenoid valves of the normal open type, a signal hydraulic pressure is not generated at a time when each of the solenoids is turned on (energized), and the signal hydraulic pressure is generated at a time when each of the solenoids is turned off (not energized). Meanwhile, since the fourth to sixth solenoid valves S4, SR and DSL are solenoid valves of the normal close type, the signal hydraulic pressure is generated at a time when each of the solenoids is turned on (energized), and the signal hydraulic pressure is not generated at a time when each of the solenoids is turned off (not energized).

Further, the line pressure PL is supplied to a manual valve 54 via the oil passages L-1, L-9 and L-10. The manual valve 54 is switched by operating a speed selecting apparatus such as a shift lever, a switch and the like (not shown), generates a second range pressure P2 in an oil passage L-151 at a time when the second range is selected, generates a D range pressure PD in an oil passage L-11 at a time when the forward range and the third range are selected, and generates an R range pressure PR in an oil passage L-12 at a time when the reverse range is selected, respectively.

The first solenoid valve SL1 receives a first solenoid signal SG1 from the control apparatus 100 adjusts a solenoid modulator pressure supplied from the solenoid modulator valve 53, generates a signal hydraulic pressure PSL1, and supplies the signal hydraulic pressure PSL1 to a B-1 control valve 55 corresponding to a first control valve via an oil passage L-15. Further, the second solenoid valve SL2 receives a second solenoid signal SG2 from the control apparatus 100, adjusts the solenoid modulator pressure supplied from the solenoid modulator valve 53, generates a signal hydraulic pressure PSL2, and supplies the signal hydraulic pressure PSL2 to a solenoid relay valve 56 via an oil passage L-16, and to a lock-up control valve 75 corresponding to a second control valve via an oil passage L-121. Furthermore, the third solenoid valve SL3 receives a third solenoid signal SG3 from the control apparatus 100 adjusts the solenoid modulator pressure supplied from the solenoid modulator valve 53, generates a signal hydraulic pressure PSL3, and supplies the signal hydraulic pressure PSL3 to a C-1 control valve 57 corresponding to a third control valve via an oil passage L-17.

The fourth solenoid valve S4 receives a fourth solenoid signal SG4 from the control apparatus 100 so as to turn on and off the solenoid, generates a signal hydraulic pressure PS4 on the basis of the line pressure PL supplied from the primary regulator valve 52 at a time when the solenoid is in an ON state, and supplies the signal hydraulic pressure PS4 to the solenoid relay valve 56 via an oil passage L-18. Further, the fifth solenoid valve SR receives a fifth solenoid signal SG5 from the control apparatus 100 so as to turn on and off the solenoid, generates a signal hydraulic pressure PSR on the basis of the line pressure PL supplied from the primary regulator valve 52 at a time when the solenoid is in an ON state, and supplies the signal hydraulic pressure PSR to the solenoid relay valve 56 via an oil passage L-19. Furthermore, the sixth solenoid valve DSL receives a sixth solenoid signal SG6 from the control apparatus 100, adjusts the solenoid modulator pressure supplied from the solenoid modulator valve 53, generates a signal hydraulic pressure PDSL, supplies the signal hydraulic pressure PDSL to the solenoid relay valve 56 via an oil passage L-21, and supplies the solenoid modulator pressure to the solenoid relay valve 56 via an oil passage L-22 without adjusting the solenoid modulator pressure.

The solenoid relay valve 56 is switched by the signal hydraulic pressure PSR supplied via the oil passage L-19, and adopts a left half position in the third speed or higher, thereby communicating between the oil passages L-22 and L-31 and between the oil passages L-18 and L-28, so as to supply the solenoid modulator pressure supplied via the oil passage L-22 to a C-0 control valve 64 corresponding to a fourth control valve, and to supply the signal hydraulic pressure PS4 supplied via the oil passages L-18 to a 4–5 shift valve 61, respectively. Further, the solenoid relay valve 56 adopts a right half position in the second speed or lower and during a 2–3 gear shifting, thereby communicating between the oil passages L-16 and L-31, between the oil passages L-21 and L-32 and between the oil passages L-18 and L-29, so as to supply the signal hydraulic pressure PSL2 supplied via the oil passage L-16 to the C-0 control valve 64, to supply the signal hydraulic pressure PDSL supplied via the oil passage L-21 to a B-2 control valve 65 corresponding to a fifth control valve, and to supply the signal hydraulic pressure PS4 supplied via the oil passage L-18 to a clutch apply control valve 66 corresponding to a sixth control valve.

The seventh solenoid valve SLT receives a seventh solenoid signal SG7 from the control apparatus 100, adjusts a solenoid modulator pressure supplied from the solenoid modulator valve 53, generates a signal hydraulic pressure PSLT, supplies the signal hydraulic pressure PSLT to the primary regulator valve 52 via an oil passage L-111, and adjusts the line pressure PL.

In this case, the second and sixth solenoid valves SL2 and DSL are used for executing a lock-up control of the torque converter 12 in the third speed or higher. Accordingly, when the solenoid relay valve 56 adopts the left half position in the third speed or higher, the signal hydraulic pressure PDSL generated in the sixth solenoid valve DSL is supplied to a lock-up relay valve 76 via an oil passage L-122.

Meanwhile, in order to engage the lock-up clutch 20 in a third speed, a fourth speed and a fifth speed of the forward range and the third speed of the third range, the second and sixth solenoid valves SL2 and DSL are turned on. That is, in a parking range, a neutral range, a reverse range, the first speed and the second speed of the forward range, and a 2–3 gear shifting, the lock-up relay valve 76 is placed at a right half position by a spring load.

Further, a surplus pressure is generated in an oil passage L-123 at a time when the line pressure PL is generated in the primary regulator valve 52. The surplus pressure is adjusted by a secondary regulator valve (not shown) so as to become a secondary pressure which is supplied to the lock-up relay valve 76 via an oil passage L-124. Further, since the lock-up relay valve 76 is placed at the right half position, the secondary pressure supplied to the lock-up relay valve 76 is supplied to the lock-up control valve 75 via an oil passage L-127 as a signal hydraulic pressure so as to place the lock-up control valve 75 at a left half position. Then, the secondary pressure passes through the lock-up control valve 75, and is supplied to a disengagement-side oil chamber 77 of the torque converter 12 via an oil passage L-128. As a result, the lock-up clutch 20 of the torque converter 12 is disengaged.

Since the fifth solenoid valve SR is turned on in the third speed, the fourth speed and the fifth speed of the forward range and the third speed of the third range, the signal hydraulic pressure PSR generated by the fifth solenoid valve SR is supplied to the solenoid relay valve 56 via the oil passage L-19, and the solenoid relay valve 56 is placed at the left half position. Further, when the second and sixth solenoid valves SL2 and DSL are turned on, the signal hydraulic pressure PDSL generated by the sixth solenoid valve DSL is supplied to the solenoid relay valve 56, and is supplied to the lock-up relay valve 76 via the oil passage L-122.

As a result, the lock-up relay valve 76 is placed at the left half position, and the secondary pressure supplied via the oil passage L-124 is supplied to an engagement-side oil chamber 78 of the torque converter 12 via an oil passage L-131, thereby engaging the lock-up clutch 20. At this time, the secondary pressure supplied to the lock-up relay valve 76 via the oil passage L-124 is supplied to the lock-up control valve 75 via an oil passage L-132 as a signal hydraulic pressure after passing through the lock-up relay valve 76, and the lock-up control valve 75 is placed at the left half position.

During this period, the secondary pressure supplied via the oil passage L-124 is supplied to the lock-up control valve 75 via an oil passage L-133. However, since the lock-up control valve 75 is placed at the left half position, the secondary pressure is supplied to the lock-up relay valve 76 via an oil passage L-135, and is further supplied to the lock-up control valve 75 via the oil passage L-127. After passing through the lock-up control valve 75, the secondary pressure is supplied to the disengagement-side oil chamber 77 via an oil passage L-128. Further, in accordance that the signal hydraulic pressure PSL2 supplied to the lock-up control valve 75 is changed, the hydraulic pressure supplied to the engagement-side oil chamber 78 is gradually increased, while the hydraulic pressure supplied to the disengagement-side oil chamber 77 is gradually reduced, and thereby the lock-up clutch 20 is gradually engaged.

The B-1 control valve 55 is supplied with the signal hydraulic pressure PSL1 via the oil passage L-15, adjusts a D range pressure PD supplied via the oil passages L-11, L-40, L-23 and L-26, the clutch apply control valve 66 and the oil passage L-24, generates a B-1 control pressure PB1, and supplies the B-1 control pressure PB1 to a B-1 apply control valve 62 via an oil passage L-25. In this case, a failsafe mechanism is constructed by the clutch apply control valve 66 and the B-1 apply control valve 62.

Further, the C-1 control valve 57 is supplied with the signal hydraulic pressure PSL3 via the oil passage L-17, adjusts the D range pressure PD supplied via the oil passages L-11, L-40 and L-34, generates a C-1 control pressure PC1, supplies the C-1 control pressure PC1 to the clutch apply control valve 66 via oil passages L-35 and L-81 and via the oil passages L-55 and L-82, and supplies the C-1 control pressure PC1 to the B-1 apply control valve 62 via the oil passage L-62. Further, the C-0 control valve 64 is supplied with the signal hydraulic pressure PSL2 via the oil passage L-31, adjusts the D range pressure PD supplied via the oil passages L-11, L-40, L-56 and L-36, generates a C-0 control pressure PC0, supplies the C-0 control pressure PC0 to the clutch apply control valve 66 via oil passages L-37 and L-52, and, after letting the C-0 control pressure PC0 pass through the clutch apply control valve 66, supplies the C-0 control pressure PC0 to the B-1 apply control valve 62 via the oil passage L-63. Furthermore, the C-0 control valve 64 supplies the C-0 control pressure PC0 to the clutch apply control valve 66 via the oil passages L-37 and L-38.

The B-2 control valve 65 is supplied with the signal hydraulic pressure PDSL via the oil passage L-32, adjusts an R range pressure PR supplied via the oil passages L-12 and L-66, the 4–5 shift valve 61, an oil passage L-67 and an oil passage L-83 to generate a B-2 control pressure PB2, supplies the B-2 control pressure PB2 to a B-2 apply control valve 67 via the oil passages L-27 and L-41, and supplies the B-2 control pressure PB2 to the hydraulic servo B-2 via an oil passage L-84.

Further, the clutch apply control valve 66 adopts the left half position due to the C-0 control pressure PC0 supplied via the oil passages L-37 and L-38, and supplies the C-0 control pressure PC0 supplied via the oil passages L-37 and L-52 to the hydraulic servo C-0 via the oil passage L-53. Furthermore, the clutch apply control valve 66 adopts the left half position due to the C-1 control pressure PC1 supplied via the oil passages L-35 and L-81, and supplies the C-1 control pressure PC1 supplied via the oil passages L-35, L-55 and L-82 to the hydraulic servo C-1 via the oil passage L-57.

Further, the D range pressure PD is supplied to the clutch apply control valve 66 via the oil passages L-11, L-40, L-56 and L-61, via the oil passages L-11, L-40 and L-23 or via the oil passages L-11, L-40, L-23 and L-26. On the other hand, in the case that the C-0 control pressure PC0 or the C-1 control pressure PC1 and the signal hydraulic pressure PS4 are not supplied to the clutch apply control valve 66, the clutch apply control valve 66 adopts the right half position due to an energizing force of a spring (not shown) corresponding to a counteractive mechanism, thereby communicating between the oil passages L-61 and L-57 and between the oil passages L-23 and L-53, so as to supply the D range pressure PD to the hydraulic servos C-1 and C-0. Accordingly, the communication between the oil passages L-26 and L-24 is shut off. Meanwhile, in the case that the clutch apply control valve 66 adopts the left half position, the communication between the oil passages L-61 and L-57 and the communication between the oil passages L-23 and L-53 are shut off.

Further, the B-1 apply control valve 62 adopts the left half position due to a line pressure PL supplied via the oil passages L-9 and L-54, receives the B-1 control pressure PB1 via an oil passage L-25, and further receives the B-1 control pressure PB1 via an oil passage L-71. Meanwhile, the B-1 apply control valve 62 adopts the right half position due to the C-0 control pressure PC0 supplied via the oil passages L-37 and L-52, the clutch apply control valve 66 and an oil passage L-63, and the C-1 control pressure PC1 supplied via the oil passages L-35, L-55 and L-62. At the right half position, the B-1 apply control valve 62 supplies the D range pressure PD supplied via the oil passages L-11, L-141 and L-72 to the oil passage L-71, and supplies the D range pressure PD supplied via the oil passages L-11, L-141 and L-73 to the 4–5 shift valve 61 via the oil passages L-64 and L-65 as a signal hydraulic pressure PFS.

In this case, the B-1 control pressure PB1, the C-0 control pressure PC0 and the C-1 control pressure PC1 are applied to the B-1 apply control valve 62 so as to move a spool upward, that is, so that the B-1 apply control valve 62 adopts the right half position. When the B-1 control pressure PB1, the C-0 control pressure PC0 and the C-1 control pressure PC1 are supplied to the B-1 apply control valve 62, and a total of each of the hydraulic pressures becomes equal to or more than a predetermined pressure, the oil passages L-73 and L-64 are communicated with each other, and the D range pressure PD is supplied to the clutch apply control valve 66 via the oil passage L-79 as the signal hydraulic pressure PFS.

The 4–5 shift valve 61 is supplied with the signal hydraulic pressure PS4 via the oil passage L-28, and adopts a left half position in the first to fourth speeds, and adopts a right half position in the fifth speed. Further, at the left half position, the 4–5 shift valve 61 supplies the line pressure PL supplied via the oil passages L-1, L-9 and L-51 to the hydraulic servo B-3 via the oil passage L-98, and supplies the R range pressure PR supplied via the oil passages L-12 and L-66 to the B-2 control valve 65 via the oil passages L-67 and L-83. On the other hand, at the right half position, the 4–5 shift valve 61 supplies the D range pressure PD supplied via the oil passages L-11 and L-68 to the hydraulic servo C-3 via the oil passage L-99. In this case, the signal hydraulic pressure PS4 supplied to the 4–5 shift valve 61 is generated by the fourth solenoid valve S4, and is supplied via the oil passage L-18, the solenoid relay valve 56 and the oil passage L-28, so as to place the spool at the right half position.

Next, the B-2 apply control valve 67 is supplied with the D range pressure PD via the oil passages L-11 and L-20 so as to adopt the left half position, and supplies the D range pressure PD to the B-2 control valve 65 via the oil passage L-70. In this case, the B-2 apply control valve 67 is supplied with the B-2 control pressure PB2 via the oil passage L-41, the hydraulic pressure supplied to the hydraulic servo C-0 via the oil passage L-85, and the B-1 control pressure PB1 via the oil passages L-25 and L-74, so as to move the spool upward, that is, so that the B-2 apply control valve 67 adopts the right half position. When two hydraulic pressures among the B-2 control pressure PB2, the oil pressure supplied to the hydraulic servo C-0 and the B-1 control pressure PB1 are supplied to the B-2 apply control valve 67, and a total of the two hydraulic pressures comprising the B-2 control pressure PB2 and the B-1 control pressure PB1 and comprising the C-0 control pressure PC0 and the B-2 control pressure PB2 becomes equal to or more than a predetermined pressure, the B-2 apply control valve 67 adopts the right half position, so as to shut off the communication between the oil passages L-20 and L-70, and to communicate the oil passage L-70 with a drain port.

Next, a description will be given of an operation of a hydraulic circuit in each of the shift ranges with reference to hydraulic circuits in FIGS. 4 and 5 and an operation table in FIG. 3.

At first, in a first speed other than that in the second range, the line pressure PL adjusted by the primary regulator valve 52 is supplied to the 4–5 shift valve 61 via the oil passages L-1, L-9 and L-51. The 4–5 shift valve 61 is not supplied with the signal hydraulic pressure PS4 from the fourth solenoid valve S4, and adopts the left half position. Accordingly, the oil passages L-51 and L-98 are communicated with each other, and the line pressure PL is supplied to the hydraulic servo B-3, so as to engage the third brake B3.

Further, since the solenoid of the first solenoid valve SL1 is turned on and the communication between the oil passages L-6 and L-15 is shut off, the signal hydraulic pressure PSL1 is not supplied to the B-1 control valve 55. Accordingly, since the communication between the oil passages L-24 and L-25 is shut off in the B-1 control valve 55, the B-1 control pressure PB1 is not supplied to the B-1 apply control valve 62 and the hydraulic servo B-1.

In the same manner, the solenoid of the second solenoid valve SL2 is turned on, and the communication between the oil passages L-7 and L-16 is shut off. Thus, the signal hydraulic pressure PSL2 is not generated.

Further, even when the solenoid of the fifth solenoid valve SR is turned off and the solenoid relay valve 56 adopts the right half position to communicate between the oil passages L-16 and L-31, the signal hydraulic pressure PSL2 is not supplied to the C-0 control valve 64. Accordingly, the communication between the oil passages L-36 and L-37 is shut off, and thereby the C-0 control pressure PC0 is not generated by the C-0 control valve 64.

Further, the solenoid of the third solenoid valve SL3 is turned off, and the third solenoid valve SL3 generates a predetermined signal hydraulic pressure PSL3 corresponding to the third solenoid signal SG3 output from the control apparatus 100 on the basis of the solenoid modulator pressure supplied via the oil passage L-8, and supplies the signal hydraulic pressure PSL3 to the C-1 control valve 57 via the oil passage L-17. The C-1 control valve 57 changes the D range pressure PD supplied via the oil passages L-11, L-40 and L-34 to the C-1 control pressure PC1 so as to supply to the clutch apply control valve 66 via the oil passages L-35 and L-81, and supply to the clutch apply control valve 66 via the oil passages L-35, L-55 and L-82. Accordingly, the clutch apply control valve 66 is placed at the left half position, and the C-1 control pressure PC1 supplied to the clutch apply control valve 66 via the oil passages L-35, L-55 and L-82 is supplied to the B-1 apply control valve 62 via the oil passage L-63, so that the B-1 apply control valve 62 adopts the left half position.

Further, the C-1 control pressure PC1 supplied to the clutch apply control valve 66 via the oil passages L-35, L-55 and L-82 is supplied to the hydraulic servo C-1 via the oil passage L-57 so as to engage the first clutch C1.

Next, the solenoid of the sixth solenoid valve DSL is turned off, and the communication between the oil passages L-5 and L-21 is shut off, whereby the signal hydraulic pressure PDSL is not generated. Thus, the solenoid of the fifth solenoid valve SR is turned off, and the solenoid relay valve 56 adopts the right half position. Further, since the hydraulic pressure is not supplied to the B-2 control valve 65 even when the oil passages L-21 and L-32 are communicated with each other, the B-2 control valve 65 adopts the left half position. Accordingly, the communication between the oil passages L-70 and L-27 is shut off, and thereby the B-2 control pressure PB2 is not generated by the B-2 control valve 65.

As mentioned above, the first clutch C1 and the third brake B3 are engaged, and the first one-way clutch F1 is locked, whereby the first speed is achieved.

In the case of the second range, in order to apply an engine brake, it is necessary to engage the second brake B2. Accordingly, on the basis of the solenoid modulator pressure supplied via the oil passage L-5, the sixth solenoid valve DSL generate the signal hydraulic pressure PDSL corresponding to the sixth solenoid signal SG6 fed from the control apparatus 100.

Further, since the solenoid of the fifth solenoid valve SR is turned off and the solenoid relay valve 56 adopts the right half position, the oil passages L-21 and L-32 are communicated with each other, and the signal hydraulic pressure PDSL supplied from the sixth solenoid valve DSL is supplied to the B-2 control valve 65 via the oil passage L-32. The B-2 control valve 65 controls a degree of communication between the oil passages L-70 and L-27 in correspondence to the signal hydraulic pressure PDSL output from the sixth solenoid valve DSL, and generates the B-2 control pressure PB2 in the oil passage L-27. The B-2 control pressure PB2 is supplied to the hydraulic servo B-2 of the second brake B2 via the oil passages L-27 and L-84 so as to engage the second brake B2. As a result, the engine brake in the first speed is achieved.

Next, a description will be given of the second speed.

The second speed is achieved by engaging the first brake B1 in addition to the state of the first speed other than that in the second range. The first solenoid signal SG1 is output by the control apparatus 100 to the first solenoid valve SL1 that is energized in the first speed. In the first solenoid valve SL1, the signal hydraulic pressure PSL1 corresponding to the first solenoid signal SG1 is generated on the basis of the solenoid modulator pressure supplied via the oil passage L-6. In the case of the B-1 control valve 55, in the first speed, the communication between the oil passages L-24 and L-25 is shut off, and the oil passage L-25 is communicated with the drain port. However, in the second speed, on the basis of the signal hydraulic pressure PSL1 supplied via the oil passage L-15, a degree of communication between the oil passages L-24 and L-25 is controlled in correspondence to the first solenoid signal SG1 output from the control apparatus 100. As a result, in the B-1 control valve 55, the B-1 control pressure PB1 is generated and supplied to the hydraulic servo B-1 via the oil passages L-25 and L-143.

Next, a description will be given of the third speed.

The third speed is achieved by engaging the fourth clutch C0 and disengaging the first brake B1, in addition to the state of the second speed. That is, the third speed is achieved by engaging the first clutch C1, the fourth clutch C0 and the third brake B3. When the solenoid of the first solenoid valve SL1 is turned off in correspondence to the first solenoid signal SG1 output from the control apparatus 100 the oil passages L-25 and the drain port are communicated in the B-1 control valve 55, and the hydraulic pressure within the hydraulic servo B-1 of the first brake B1 which is engaged in the second speed state is drained.

Further, the second solenoid valve SL2 is controlled so as to generate the signal hydraulic pressure PSL2 in accordance with the second solenoid signal SG2 output from the control apparatus 100 on the basis of the solenoid modulator pressure supplied via the oil passage L-7. Then, the signal hydraulic pressure PSL2 is supplied to the solenoid relay valve 56 via the oil passage L-16.

In this case, the solenoid relay valve 56 adopts the left half position in the third speed or higher, however, maintains the right half position until the third speed is achieved, that is, during the 2–3 gear shifting. Accordingly, during the 2–3 gear shifting, the oil passage L-16 is communicated with the oil passage L-31 via the solenoid relay valve 56, and the signal hydraulic pressure PSL2 is supplied to the C-0 control valve 64 via the oil passage L-16, the solenoid relay valve 56 and the oil passage L-31. As a result, the D range pressure PD supplied via the oil passages L-11, L-40, L-56 and L-36 is adjusted so as to constitute the C-0 control pressure PC0, and is supplied to the clutch apply control valve 66 via the oil passages L-37 and L-38, and via the oil passages L-37 and L-52. Further, the C-0 control pressure PC0 supplied to the clutch apply control valve 66 via the oil passages L-37 and L-38 is applied so that the clutch apply control valve 66 adopts the left half position.

Then, the C-0 control pressure PC0 supplied to the clutch apply control valve 66 via the oil passages L-37 and L-52 is supplied to the hydraulic servo C-0 of the fourth clutch C0 via the oil passage L-53 so as to engage the fourth clutch C0, and is supplied to the B-1 apply control valve 62 via the oil passage L-63 so as to switch the B-1 apply control valve 62 to the right half position. Further, the hydraulic pressure of the hydraulic servo C-0 is supplied to the B-2 apply control valve 67 via the oil passage L-85 so as to switch the B-2 apply control valve 67 to the left half position.

When the gear shifting to the third speed is completed, the solenoid of the fifth solenoid valve SR is turned on in accordance with the fifth solenoid signal SG5 output from the control apparatus 100. The fifth solenoid valve SR generates the signal hydraulic pressure PSR on the basis of the line pressure PL supplied via the oil passages L-1 and L-4. Accordingly, the solenoid relay valve 56 adopts the left half position, and the control of the lock-up control valve 75 and the lock-up relay valve 76 are executed by the second and sixth solenoid valves SL2 and DSL.

Further, since the solenoid relay valve 56 adopts the left half position, the solenoid modulator pressure output from the solenoid modulator valve 53 is supplied to the C-0 control valve 64 via the oil passages L-5 and L-22, the solenoid relay valve 56 and the oil passage L-31 so as to maintain the communication between the oil passages L-36 and L-37. Accordingly, in the shift range of the third speed or higher, the fourth clutch C0 is kept engaged. Further, the signal hydraulic pressure PDSL for controlling the B-2 control valve 65 is supplied to the B-2 control valve 65 via the oil passage L-32. The solenoid relay valve 56 is switched to the left half position so as to communicate the oil passage L-32 with the drain port, whereby the B-2 control valve 65 maintains the left half position, and the communication between the oil passages L-70 and L-27 is shut off.

Next, a description will be given of the fourth speed.

The fourth speed is achieved by engaging the first brake B1 and disengaging the first clutch C1, in addition to the state of the third speed. That is, the fourth speed is achieved by engaging the fourth clutch C0, the first brake B1 and the third brake B3. The hydraulic pressure within the hydraulic servo C-1 of the first clutch C1 which, is engaged in the third speed, is drained via the oil passage L-57, the clutch apply control valve 66, the oil S passages L-82, L-55 and L-35, and the C-1 control valve 57 in the case that the solenoid of the third solenoid valve SL3 is turned on in correspondence to the third solenoid signal SG3 output from the control apparatus 100. In the manner mentioned above, the first clutch C1 is disengaged.

Further, the first solenoid valve SL1 generates the signal hydraulic pressure PSL1 in accordance with the first solenoid signal SG1 output from the control apparatus 100 on the basis of the solenoid modulator pressure supplied via the oil passage L-6, and the signal hydraulic pressure PSL1 is supplied to the B-1 control valve 55 via the oil passage L-15. The B-1 control valve 55 generates the B-1 control pressure PB1 on the basis of the D range pressure PD supplied via the oil passage L-24. The B-1 control pressure PB1 is supplied to the hydraulic servo B-1 of the first brake B1 via the oil passages L-25 and L-143. In the manner mentioned above, the first brake B1 is engaged.

Next, a description will be given of the fifth speed.

The fifth speed is achieved by engaging the third clutch C3 and disengaging the third brake B3, in addition to the state of the fourth speed. That is, the fifth speed is achieved by engaging the third clutch C3, the fourth clutch C0 and the first brake B1. The signal hydraulic pressure PS4 output from the fourth solenoid valve S4 is generated by the fourth solenoid signal SG4 output from the control apparatus 100 and is supplied to the 4–5 shift valve 61 via the oil passage L-18, the solenoid relay valve 56 and the oil passage L-28, and the 4–5 shift valve 61 which is kept in the left half position is switched to the right half position. Accordingly, the communication between the oil passages L-51 and L-98 is shut off, the oil passage L-98 is communicated with the drain port via the 4–5 shift valve 61, and the hydraulic pressure of the hydraulic servo B-3 is drained. In the manner mentioned above, the third brake B3 is disengaged.

Further, the oil passage L-99 and the drain port are communicated with each other via the 4–5 shift valve 61, however, as the 4–5 shift valve 61 adopts the right half position, the oil passages L-68 and L-99 are communicated with each other. Accordingly, the D-range pressure PD is supplied to the hydraulic servo C-3 of the third clutch C3 via the oil passages L-11, L-68 and L-99. In the manner mentioned above, the third clutch C3 can be engaged.

In this case, each of the first to seventh solenoid valves SL1 to SL3, S4, SR, DSL and SLT and the oil temperature sensor 81 are mounted on the valve body of the hydraulic circuit having the structure mentioned above, and are connected to the control apparatus 100 of the automatic transmission 11 by a wire connector unit (not shown).

Figure 1:
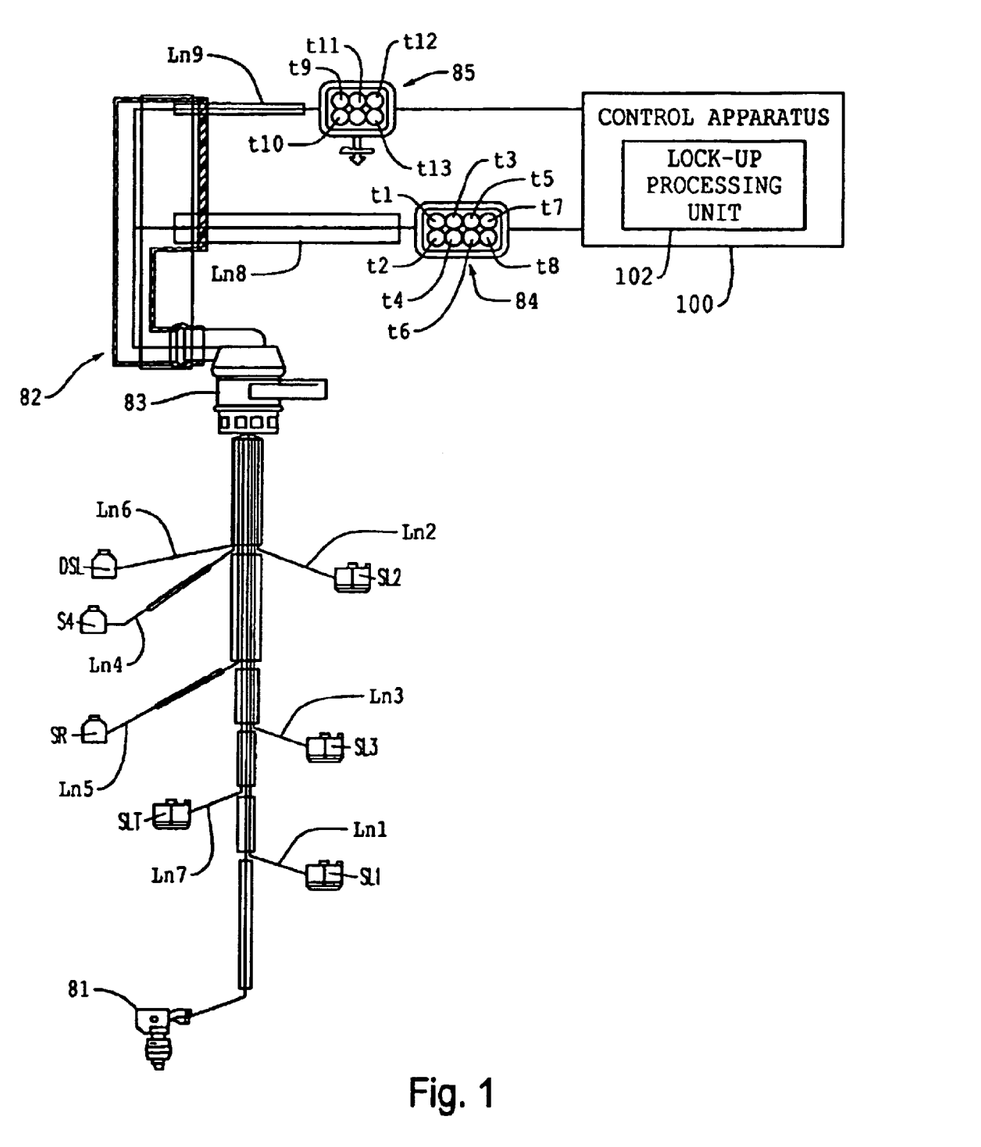
FIG. 1 is a view showing a connection state established by a wire connector unit in an embodiment in accordance with the invention.

FIG. 1 is a view showing a connecting state established by the wire connector unit in the embodiment in accordance with the invention.

In the drawing, reference symbols SL1 to SL3, S4, SR, DSL and SLT denote first to seventh solenoid valves, reference numeral 81 denotes an oil temperature sensor, and reference numeral 82 denotes a wire connector unit which connects the first to seventh solenoid valves SL1 to SL3, S4, SR, DSL and SLT and the oil temperature sensor 81 to the control apparatus 100. The wire connector unit 82 is provided with a connector 83 mounted on the automatic transmission case 30 (FIG. 2), lines Ln1 to Ln7 which connect the connector 83 to the first to seventh solenoid valves SL1 to SL3, S4, SR, DSL and SLT and the oil temperature sensor 81, a first connector 84 having eight poles of terminals t1 to t8, a second connector 85 having five poles of terminals t9 to t13, and lines Ln8 and Ln9 which connect the first and second connectors 84 and 85 to the connector 83.

The first to third and seventh solenoid valves SL1 to SL3 and SLT are the normal open type linear solenoid valves whose opening angle can be changed proportionally by differentiating values of the first to third solenoid signals SG1 to SG3 and the seventh solenoid signal SG7. Further, the fourth and fifth solenoid valves S4 and SR are the normal close type on-off valves which can be opened and closed in accordance with a high level or a low level of the fourth and fifth solenoid signals SG4 and SG5. The sixth solenoid valve DSL is a normal close type duty solenoid valve whose opening angle is changed in accordance with an on/off duty. Accordingly, the first to seventh solenoid valves SL1 to SL3, S4, SR, DSL and SLT can be classified into the first to third and seventh solenoid valves SL1 to SL3 and SLT which are the linear type solenoid valves, and the fourth to sixth solenoid valves S4, SR and DSL which are the on-off type solenoid valves.

In the first connector 84, the terminal t1 corresponds to a positive terminal for the first solenoid valve SL1, the terminal t2 corresponds to a negative terminal for the first solenoid valve SL1, the terminal t3 corresponds to a positive terminal for the second solenoid valve SL2, the terminal t4 corresponds to a negative terminal for the second solenoid valve SL2, the terminal t5 corresponds to a positive terminal for the third solenoid valve SL3, the terminal t6 corresponds to a negative terminal for the third solenoid valve SL3, the terminal t7 corresponds to a positive terminal for the seventh solenoid valve SLT, and the terminal t8 corresponds to a negative terminal for the seventh solenoid valve SLT.

Further, in the second connector 85, the terminal t9 corresponds to a terminal for the fourth solenoid valve S4, the terminal t10 corresponds to a terminal for the fifth solenoid valve SR, the terminal t11 corresponds to a terminal for the sixth solenoid valve DSL, the terminal t12 corresponds to a positive terminal for the oil temperature sensor 81, and the terminal t13 corresponds to a negative terminal for the oil temperature sensor 81.

Since the first to third and seventh solenoid valves SL1 to SL3 and SLT requires high accuracy in values of the first to third and seventh solenoid signals SG1 to SG3 and SG7, and the oil temperature sensor 81 requires high accuracy in the detected oil temperature, the positive terminals and the negative terminals are arranged.

In this case, when an external force and the like are applied to the wire connector unit 82, there is a case that the wire connector unit 82 comes off from the control apparatus 100 and the like at the portion of the first and second connectors 84 and 85. However, in this case, in the embodiment in accordance with the invention, the structure is made such that the failsafe operation is executed so that the vehicle is driven in a predetermined shift range in the high speed side, that is, in an approximate fourth speed.

Accordingly, as mentioned above, the terminals t1 to t8 for the first to third solenoid valves SL1 to SL3 and SLT of the normal open type are arranged in the first connector 84, and the terminals t9 to t11 for the fourth to sixth solenoid valves S4, SR and DSL of the normal close type are arranged in the second connector 85.

Next, a description will be given of the failsafe operation in the case that the first and second connectors 84 and 85 are disconnected.

At first, in the case that the first connector 84 is disconnected, the first to third and seventh solenoid valves SL1 to SL3 and SLT are turned off, whereby the signal hydraulic pressure PSL1 supplied to the B-1 control valve 55 (FIG. 5), the signal hydraulic pressure PSL2 supplied to the C-0 control valve 64 via the solenoid relay valve 56, the signal hydraulic pressure PSL3 supplied to the C-1 control valve 57, and the signal hydraulic pressure PSLT supplied to the primary regulator valve 52 (FIG. 4) are maximized. As a result, the B-1 control valve 55, the C-0 control valve 64 and the C-1 control valve 57 are placed at the right half position, and the B-1 control pressure PB1, the C-0 control pressure PC0 and the C-1 control pressure PC1 are maximized.

Further, in the first speed, in the case that the first connector 84 is disconnected at a time when the first clutch C1 and the third brake B3 are engaged, the C-0 control pressure PC0 is supplied to the B-1 apply control valve 62 via the oil passages L-37, L-52 and L-63, and the B-1 control pressure PB1 is supplied to the B-1 apply control valve 62 via the oil passages L-25 and L-71, so that the B-1 apply control valve 62 is placed at the right half position. Accordingly, in the B-1 apply control valve 62, the oil passages L-73 and L-64 are communicated with each other, and thereby the D-range pressure PD is supplied to the 4–5 shift valve 61 via the oil passages L-64 and L-65 so as to place the 4–5 shift valve 61 at the right half position, and is supplied to the clutch apply control valve 66 via the oil passages L-64 and L-79 so as to place the clutch apply control valve 66 at the right half position. At this time, the oil passages L-72 and L-71 are communicated with each other, and the D range pressure PD is fed back to the B-1 apply control valve 62 via the oil passage L-71.

Then, in the 4–5 shift valve 61, the communication between the oil passages L-51 and L-98 is shut off, whereby the D-range pressure PD is not supplied to the hydraulic servo B-3, and the oil passages L-68 and L-99 are communicated with each other, whereby the D-range pressure PD is supplied to the third clutch C3. As a result, the third brake B3 is disengaged, and the third clutch C3 is engaged.

Further, in accordance that the clutch apply control valve 66 is placed at the right half position, the D range pressure PD is supplied to the clutch apply control valve 66 via the oil passage L-61, and is further supplied to the hydraulic servo C-1 via the oil passage L-57. Also, in the clutch apply control valve 66, the oil passages L-23 and L-53 are communicated with each other, and the D range pressure PD is supplied to the hydraulic servo C-0 via the oil passage L-53.

Accordingly, the first clutch C1, the third clutch C3 and the fourth clutch C0 are engaged, and the approximate fourth speed is achieved.

Next, in the second speed, in the case that the first connector 84 is disconnected at a time when the first clutch C1, the first brake B1 and the third brake B3 are engaged, the C-0 control pressure PC0 is supplied to the B-1 apply control valve 62 via the oil passages L-37, L-52 and L-63, so as to place the B-1 apply control valve 62 at the right half position. Accordingly, in the B-1 apply control valve 62, the oil passages L-73 and L-64 are communicated with each other, and thereby the D-range pressure PD is supplied to the 4–5 shift valve 61 via the oil passages L-64 and L-65 so as to place the 4–5 shift valve 61 at the right half position, and is supplied to the clutch apply control valve 66 via the oil passages L-64 and L-79 so as to place the clutch apply control valve 66 at the right half position. At this time, the oil passages L-72 and L-71 are communicated with each other, and the D range pressure PD is fed back to the B-1 apply control valve 62 via the oil passage L-71.

Then, in the 4–5 shift valve 61, the communication between the oil passages L-51 and L-98 is shut off, whereby the D-range pressure PD is not supplied to the hydraulic servo B-3, and the oil passages L-68 and L-99 are communicated with each other, whereby the D-range pressure PD is supplied to the third clutch C3. As a result, the third brake B3 is disengaged, and the third clutch C3 is engaged.

Further, in accordance that the clutch apply control valve 66 is placed at the right half position, the D range pressure PD is supplied to the clutch apply control valve 66 via the oil passage L-61, and is further supplied to the hydraulic servo C-1 via the oil passage L-57. Also, in the clutch apply control valve 66, the oil passages L-23 and L-53 are communicated with each other, and the D range pressure PD is supplied to the hydraulic servo C-0 via the oil passage L-53. Furthermore, in the clutch apply control valve 66, since the communication between the oil passages L-26 and L-24 is shut off and thereby the D range pressure PD is not supplied to the B-1 control valve 55, the B-1 control pressure PB1 is not generated in the B-1 control valve 55, and is not supplied to the hydraulic servo B-1.

Accordingly, the first clutch C1, the third clutch C3 and the fourth clutch C0 are engaged, and the approximate fourth speed is achieved.

Next, in the third speed, in the case that the first connector 84 is disconnected at a time when the first clutch C1, the fourth clutch C0 and the third brake B3 are engaged, the third brake B3 is disengaged in the same manner as in the first speed and the second speed, and the first clutch C1, the third clutch C3 and the fourth clutch C0 are engaged, whereby the approximate fourth speed is achieved.

Further, in the fourth speed, in the case that the first connector 84 is disconnected at a time when the fourth clutch C0, the first brake B1 and the third brake B3 are engaged, the third brake B3 is disengaged in the same manner as in the first speed and the second speed, and also the first brake B1 is disengaged in the same manner as in the second speed, and the first clutch C1, the third clutch C3 and the fourth clutch C0 are engaged, whereby the approximate fourth speed is achieved.

Further, in the fifth speed, in the case that the first connector 84 is disconnected at a time when the third clutch C3, the fourth clutch C0 and the first brake B1 are engaged, the first brake B1 is disengaged in the same manner as in the second speed, and the first clutch C1, the third clutch C3 and the fourth clutch C0 are engaged, whereby the approximate fourth speed is achieved. As a result, it is possible to keep the vehicle running.

As mentioned above, since the approximate fourth speed is achieved in the case that the first connector 84 is disconnected while the vehicle is driven in each of the shift ranges, it is possible to prevent a braking force of an engine brake from being increased even when the failsafe operation is executed while the vehicle is driven in the shift range in the high speed side such as the fourth speed, the fifth speed and the like. Accordingly, it is possible to reduce the shift shock given to the driver.

In the present embodiment, the failsafe mechanism is constructed by the clutch apply control valve 66 and the B-1 apply control valve 62. However, it is possible to achieve the approximate fourth speed by using the other valves as the failsafe mechanism and supplying a predetermined control hydraulic pressure.

Meanwhile, when the first connector 84 is disconnected while the vehicle is driven in each of the shift ranges, and after the approximate fourth speed is achieved, the driver can achieve a predetermined shift range in the low speed side, for example, the third speed by operating the speed selecting apparatus so as to switch the manual valve 54 corresponding to the shift range changing mechanism.

To that purpose, a fail detection processing unit (not shown) of the control apparatus 100 executes a fail detection process to detect disconnection of the first connector 84 on the basis of the first to seventh solenoid signal SG1 to SG7, and a display processing unit (not shown) of the control apparatus 100 executes a display process to display that the approximate fourth speed is achieved on a display apparatus (not shown).

Further, when the driver operates the speed selecting apparatus so as to switch the manual valve 54 from the forward range to the low-speed-side range, for example, the second range, whereby the second range pressure P2 is generated in the oil passage L-151, the 4–5 shift valve 61 is placed at the left half position. Accordingly, in the 4–5 shift valve 61, the communication between the oil passages L-68 and L-99 is shut off, whereby the D range pressure PD is not supplied to the hydraulic servo C-3, and the oil passages L-51 and L-98 are communicated with each other, whereby the line pressure PL is supplied to the hydraulic servo B-3. Consequently, the first clutch C1, the fourth clutch C0 and the third brake B3 are engaged, and the third speed is achieved. As a result, it is possible to secure a driving force for starting the vehicle. In accordance with the present embodiment, the third speed is achieved by switching the manual valve 54 corresponding to the shift range changing mechanism. However, the other predetermined valve may be used in place of the manual valve 54, so that, by manually switching the valve, the signal hydraulic pressure is fed to the 4–5 shift valve 61 so as to switch the 4–5 shift valve 61.

Meanwhile, in the case of driving the vehicle on the climbing road with a large inclination in the third speed or the approximate fourth speed, a load applied to the torque converter 12, the variable speed gear 13 and the like of the automatic transmission 11 is increased and an oil temperature becomes suddenly high. Accordingly, the structure is made such that the oil temperature is detected by the oil temperature sensor 81, and a lock-up processing unit 102 of the control apparatus 100 executes the lock-up process, so as to read the oil temperature detected by the oil temperature sensor 81, judge whether the oil temperature is over a threshold value, and engage or disengage the lock-up clutch 20 on the basis of the result of judgment.

In this case, since the second connector 85 is connected, the lock-up processing unit 102 judges whether the oil temperature is higher than the threshold value, and turns on the fifth and sixth solenoid valves SR and DSL in the case that the oil temperature is higher than the threshold value. When the fifth solenoid valve SR is turned on, the signal hydraulic pressure PSR is supplied to the solenoid relay valve 56 via the oil passage L-19, and the solenoid relay valve 56 is placed at the left half position. Further, the signal hydraulic pressure PDSL generated by the sixth solenoid valve DSL is supplied to the lock-up relay valve 76 via the oil passage L-21, the solenoid relay valve 56 and the oil passage L-122, and the lock-up relay valve 76 is placed at the left half position.

As a result, the secondary pressure supplied via the oil passage L-124 is supplied to the engagement-side oil chamber 78 of the torque converter 12 via the oil passage L-131, and the lock-up clutch 20 is engaged.

As mentioned above, since the lock-up clutch 20 is engaged if the load applied to the torque converter 12, the variable speed gear 13 and the like of the automatic transmission 11 is increased and the oil temperature becomes higher than the threshold value in the case of driving the vehicle on the climbing road with a large inclination in the third speed or the approximate fourth speed, it is possible to prevent the oil within the torque converter 12 from being agitated.

Further, for example, in the case of driving the vehicle in the shift range equal to or lower than the second speed, or in the case that the oil temperature is equal to or lower than the threshold value, the lock-up processing unit 102 turns off the fifth and sixth solenoid valves SR and DSL. When the fifth solenoid valve SR is turned off, the signal hydraulic pressure PSR is not supplied to the solenoid relay valve 56, and the solenoid relay valve 56 is placed at the right half position. Further, the signal hydraulic pressure PDSL is not generated by the sixth solenoid valve DSL, and the lock-up relay valve 76 is placed at the right half position.

As a result, the secondary pressure supplied to the lock-up relay valve 76 is supplied to the lock-up control valve 75 via the oil passage L-127 as the signal hydraulic pressure, and the lock-up control valve 75 is placed at the left half position. Further, the secondary pressure passes through the lock-up control valve 75 and is supplied to the disengagement-side oil chamber 77 of the torque converter 12 via the oil passage L-128. As a result, the lock-up clutch 20 is disengaged.

Meanwhile, in the case that the second connector 85 is disconnected, the fourth to sixth solenoid valves S4, SR and DSL are turned off, and the values of the signal hydraulic pressure PS4, PSR and PDSL supplied to the solenoid relay valve 56 becomes 0. As a result, the solenoid relay valve 56 is placed at the right half position, whereby the signal hydraulic pressure PS4 is not supplied to the 4–5 shift valve 61, and the signal hydraulic pressure PDSL is not supplied to the lock-up relay valve 76.

In this case, since the first connector 84 is connected, the signal hydraulic pressure PSL1 supplied to the B-1 control valve 55, the signal hydraulic pressure PSL2 supplied to the C-0 control valve 64 via the solenoid relay valve 56, the signal hydraulic pressure PSL3 supplied to the C-1 control valve 57, and the signal hydraulic pressure PSLT supplied to the primary regulator valve 52 become proper. Therefore, the B-1 control valve 55, the C-0 control valve 64 and the C-1 control valve 57 are placed at the right half position, and thereby the B-1 control pressure PB1, the C-0 control pressure PC0 and the C-1 control pressure PC1 are also made proper.

Further, in the case that the second connector 85 is disconnected while the vehicle is driven in the first to fourth speeds, the B-1 control pressure PB 1, the C-0 control pressure PC0 and the C-1 control pressure PC1 are properly generated since the first connector 84 is connected. Therefore, the hydraulic pressure can normally be supplied to the predetermined hydraulic servo, and the first to fourth speeds can be achieved as mentioned above.

However, since the signal hydraulic pressure PDSL can not be supplied to the lock-up relay valve 76, the lock-up relay valve 76 is placed at the right half position, and the lock-up clutch 20 is kept disengaged and can not be engaged. Further, in the case that the second connector 85 is disconnected while the vehicle is driven in the fifth speed, the signal hydraulic pressure PS4 can not be generated, and thus the signal hydraulic pressure PS4 can not be supplied to the 4–5 shift valve 61. Accordingly, the 4–5 shift valve 61 is placed at the left half position, whereby the D range pressure PD is not supplied to the hydraulic servo C-3, and therefore the shift range is shifted to one speed lower, which is the fourth speed.

As mentioned above, since the first speed to the fourth speed is achieved when the second connector 85 is disconnected, it is possible to prevent the braking force of the engine brake from being increased even when the failsafe operation is executed while the vehicle is driven in the shift range in the high speed side such as the fourth speed, the fifth speed and the like. Accordingly, the shift shock given to the driver can be reduced. Further, in the case of starting the vehicle, the low-speed-side shift range is selected so that a sufficient driving force can be secured.

Meanwhile, when driving the vehicle on the climbing road with a large inclination, the load applied to the variable speed gear 13 is increased and the oil temperature becomes suddenly high. However, in this case, when the fail detection processing unit detects disconnection of the second connector 85 on the basis of the first to seventh solenoid signals SG1 to SG7, the gear shift processing mechanism executes the gear shift process, and selects and achieves the predetermined shift range in correspondence to the load. That is, the gear shift processing mechanism reads a vehicle speed which represents a running condition and is detected by a vehicle speed detector such as a vehicle speed sensor (not shown), a vehicle speed detecting apparatus and the like, and a throttle opening angle which represents the engine load and is detected by a throttle opening angle detector such as an accelerator opening angle sensor (not shown), a throttle opening angle sensor and the like, and refers to a shift map recorded in a memory corresponding to a recording apparatus (not shown), in order to select the shift range corresponding to the vehicle speed and the throttle opening angle among the first to fourth speeds. Accordingly, it is possible to prevent the load applied to the variable speed gear 13 from being increased, and therefore the oil temperature does not become high.

In this case, the invention is not limited to the embodiment mentioned above, and can be variously modified on the basis of the scope of the invention, and does not intend to exclude them from the scope of the invention.

What is claimed is:

1. An automatic transmission, comprising:
   a plurality of hydraulic servos which respectively engage and disengage a plurality of frictional engagement elements;
   a first solenoid valve for gear shifting which is used for generating a hydraulic pressure supplied to a predetermined hydraulic servo;
   a second solenoid valve for lock-up which is used for generating a hydraulic pressure supplied to a fluid transmission apparatus for executing a lock-up;
   a control apparatus;
   a first connector which connects the first solenoid valve and the control apparatus;
   a second connector which connects the second solenoid valve and the control apparatus;
   a failsafe mechanism which achieves a predetermined shift range in a high-speed-side when the first connector is disconnected; and a gear shift processing mechanism which achieves a predetermined shift range among a plurality of shift ranges when the second connector is disconnected.

2. The automatic transmission according to claim 1, comprising:

a shift range changing mechanism for achieving, after the predetermined shift range in the high-speed-side is achieved when the first connector is disconnected, a predetermined shift range in a lower-speed-side than the predetermined shift range in the high-speed-side.

3. The automatic transmission according to claim 1, comprising:

a lock-up processing unit which executes a lock-up of the fluid transmission apparatus when the first connector is disconnected.

4. A method of operating an automatic transmission, comprising:

achieving a predetermined shift range in a high-speed-side when a first solenoid valve and a control apparatus are disconnected; and achieving a predetermined shift range among a plurality of shift ranges when a second solenoid valve and the control apparatus are disconnected, wherein the first solenoid valve generates a hydraulic pressure supplied to a predetermined hydraulic servo for executing a gear shift and the second solenoid valve generates a hydraulic pressure supplied to a fluid transmission apparatus for executing a lock-up.

5. The method of claim 4, comprising:

achieving, after the predetermined shift range in the high-speed-side is achieved when the first solenoid valve and the control apparatus are disconnected, a predetermined shift range in a lower-speed-side than the predetermined shift range in the high-speed-side.

6. The method of claim 4, comprising:

executing a lock-up of the fluid transmission apparatus when the first solenoid valve and the control apparatus are disconnected.

7. A computer readable memory medium for an automatic transmission, comprising:

a program that achieves a predetermined shift range in a high-speed-side when a first solenoid valve and a control apparatus are disconnected; and a program that achieves a predetermined shift range among a plurality of shift ranges when a second solenoid valve and the control apparatus are disconnected.

8. The memory medium of claim 7, comprising:

a program that achieves, after the predetermined shift range in the high-speed-side is achieved when the first solenoid valve and the control apparatus are disconnected, a predetermined shift range in a lower-speed-side than the predetermined shift range in the high-speed-side.

9. The memory medium of claim 7, comprising:

a program that executes a lock-up of a fluid transmission apparatus when the first solenoid valve and the control apparatus are disconnected.

10. The memory medium of claim 7, wherein the first solenoid valve generates a hydraulic pressure supplied to a predetermined hydraulic servo for executing a gear shift and the second solenoid valve generates a hydraulic pressure supplied to a fluid transmission apparatus for executing a lock-up.

* * * * *